United States Patent
Park et al.

(10) Patent No.: US 7,079,218 B2
(45) Date of Patent: Jul. 18, 2006

(54) OPTICALLY COMPENSATED BIREFRINGENCE MODE LIQUID CRYSTAL DISPLAY DEVICE HAVING SPECIFIC RETARDATIONS IN SPLAY AND BEND STATES AND METHOD OF FABRICATING THE SAME

(75) Inventors: Ku-Hyun Park, Gyeonggi-do (KR); Sang-Ho Choi, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/607,044

(22) Filed: Jun. 27, 2003

(65) Prior Publication Data
US 2004/0125323 A1    Jul. 1, 2004

(30) Foreign Application Priority Data
Dec. 30, 2002    (KR) .................. 10-2002-0087544

(51) Int. Cl.
*C09K 19/02*    (2006.01)
(52) U.S. Cl. .................. 349/191; 349/130; 349/169; 349/181
(58) Field of Classification Search ............... 349/117, 349/132, 169, 181, 188
See application file for complete search history.

(56) References Cited

U.S. PATENT DOCUMENTS

| | | | |
|---|---|---|---|
| 5,736,066 A * | 4/1998 | Noguchi et al. | ....... 252/299.01 |
| 5,774,197 A | 6/1998 | Nakamura | |
| 6,124,913 A | 9/2000 | Mazaki et al. | |
| 6,137,554 A | 10/2000 | Nakamura | |
| 6,512,569 B1 | 1/2003 | Acosta et al. | |
| 6,597,424 B1 * | 7/2003 | Hattori et al. | ............... 349/146 |
| 6,657,690 B1 * | 12/2003 | Hashimoto | .................. 349/117 |

* cited by examiner

*Primary Examiner*—Andrew Schechter
*Assistant Examiner*—Michael H. Caley
(74) *Attorney, Agent, or Firm*—Morgan, Lewis & Bockius, LLP

(57) ABSTRACT

An optically compensated birefringence mode liquid crystal display device includes first and second substrates facing and spaced apart from each other, a liquid crystal material layer between the first and second substrates, the liquid crystal material layer having a splay state when a voltage is not applied and having a bend state when a transition voltage is applied, a first compensation film on an outer surface of the first substrate, a first polarizing plate on the first compensation film, a second compensation film on an outer surface of the second substrate, and a second polarizing plate on the second compensation film, wherein the liquid crystal material layer in the splay state has a first retardation value (R1) satisfying according to:

$$1.35 < R1/\lambda < 1.75$$

the liquid crystal material layer in the bend state has a second retardation value (R2) according to:

$$0.5 < R2/\lambda < 0.7$$

when a white voltage for a white image is applied, and a third retardation value (R3) according to:

$$0.1 < R3/\lambda < 0.15$$

when a black voltage for a black image is applied.

20 Claims, 9 Drawing Sheets

Splay state when a voltage is not applied

Bend state
when a transition voltage is applied

Vertically aligned
when voltages are applied $\Delta n_{LC}$ (400nm/550nm)=1.551

$\Delta n_{ic2}$ (400nm/550nm)=1.273

OPTICALLY COMPENSATED BIREFRINGENCE MODE LIQUID CRYSTAL DISPLAY DEVICE HAVING SPECIFIC RETARDATIONS IN SPLAY AND BEND STATES AND METHOD OF FABRICATING THE SAME

The present invention claims the benefit of the Korean Application No. P2002-87544 filed in Korea on Dec. 30, 2002, which is hereby incorporated by reference.

BACKGROUND OF THE INVENTION

1. Field of the Invention

The present invention relates to a liquid crystal display device and a method of fabricating a liquid crystal display device, and more particularly, to an optically compensated birefringence mode liquid crystal display device and a method of fabricating an optically compensated birefringence mode liquid crystal display device.

2. Discussion of the Related Art

Among various types of liquid crystal display (LCD) devices commonly used, active matrix LCD (AM-LCD) devices in which switching elements, such as thin film transistors (TFTs), are disposed in a matrix configuration for each pixel region have been developed because of their high resolution and superiority in displaying moving images.

The LCD devices may use an electro-optical effect, wherein images are displayed by changing optical properties of a liquid crystal material layer due to a voltage applied to the liquid crystal material layer. The LCD devices that make use of the electro-optical properties can be classified into three types: current-effect type; electric field-effect type; and heat-effect type. The LCD devices of the electric field-effect type function in one of a twisted nematic (TN) mode, a guest-host (GH) mode, an electrically controlled birefringence (ECB) mode, and a phase change mode.

In the ECB mode, a liquid crystal material layer that is uniformly oriented is interposed between orthogonal polarizers, whereby light transmittance is changed according to the birefringence effect of the applied voltage. An LCD device of an optically compensated birefringence (OCB) mode, which is one of the ECB modes, has a symmetric bend structure such that an angle between a long axis of liquid crystal (LC) molecules and the substrate is nearly 90° toward a midway point between the upper and lower substrates, wherein the angle gradually decreases as the molecules approach the substrates. Therefore, the LCD device of the OCB mode has a relatively low response time.

FIG. 1 is a schematic perspective view of an optically compensated birefringence mode liquid crystal display device including a compensation film according to the related art. In FIG. 1, a bend cell 50 includes first and second substrates 10 and 30 spaced apart from each other and a liquid crystal material layer 40 disposed therebetween. The first and second substrates 10 and 30 may include respective orientation films having identical alignment directions. The liquid crystal material layer 40 has a splay structure when a voltage is not applied, and has a bend structure when a voltage that is above a transition voltage is applied. Accordingly, a time for realignment, i.e., a response time, is less than about 5 milliseconds.

However, the bend cell 50 uses a wide view film including a retarder to improve a viewing angle with high display quality. Accordingly, a first compensation film 12 and a first polarizing film 14 are sequentially formed on an outer surface of the first substrate 10, and a second compensation film 32 and a second polarizing film 34 are sequentially formed on an outer surface of the second substrate 30, wherein a first optical axis of the first compensation film 12 is perpendicular to a second optical axis of the second compensation film 32, and a first transmission axis of the first polarizing film 14 is perpendicular to a second transmission axis of the second polarizing film 34. The first compensation film 12 is a wide view film including a first discotic film 12a having a negative refractive index anisotropy (Δn) and a first biaxial film 12b sequentially formed on the outer surface of the first substrate 10. Similarly, the second compensation film 32 is also a wide view film including a second discotic film 32a having a negative refractive index anisotropy (Δn) and a second biaxial film 32b sequentially formed on the outer surface of the second substrate 30. The first and second biaxial film 12b and 32b have a birefringence property of $n_y > n_x > n_z$.

When an OCB mode LCD device is fabricated, several factors, such as brightness, viewing angle, driving voltage, and response time, are considered. Exact design of the bend cell and the compensation film are especially important factors during fabrication of the OCB mode LCD device. Accordingly, several physical parameters of the liquid crystal material layer and design value of the compensation film determine performance of the OCB mode LCD device.

FIGS. 2A to 2C are schematic cross sectional views showing a driving principle of an optically compensated birefringence mode liquid crystal display device according to the related art. In FIG. 2A, a liquid crystal material layer has a splay structure when a voltage is not applied to the liquid crystal material layer. In FIG. 2B, the liquid crystal material layer has a bend structure when a transition voltage is applied. In FIG. 2C, liquid crystal molecules of the liquid crystal material layer are vertically aligned from the bend structure when voltages are applied. Therefore, a response of the OCB mode LCD device is faster than that of a TN mode LCD device.

SUMMARY OF THE INVENTION

Accordingly, the present invention is directed to an optically compensated birefringence mode liquid crystal display device and a method of fabricating an optically compensated birefringence mode liquid crystal display device that substantially obviates one or more of the problems due to limitations and disadvantages of the related art.

An object of the present invention is to provide an optically compensated birefringence mode liquid crystal display device having high response and wide viewing.

Another object of the present invention is to provide a method of fabricating an optically compensated birefringence mode liquid crystal display device having high response and wide viewing.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optically compensated birefringence mode liquid crystal display device includes first and second substrates facing and spaced apart from each other, a liquid crystal material layer between the first and second substrates, the liquid crystal material layer having a splay state when a voltage is not applied and having a bend state when a transition voltage is applied, a first compensation film on an outer surface of the first substrate, a first polarizing plate on the first compensation film, a second compensation film on an outer surface of the second substrate, and a second polarizing plate on the second compensation film, wherein the liquid crystal material layer in the splay state has a first retardation value (R1) satisfying according to equation (1), $$1.35 < R1/\lambda < 1.75 \qquad (1)$$

the liquid crystal material layer in the bend state has a second retardation value (R2) according to equation (2) when a white voltage for a white image is applied, $$0.5 < R2/\lambda < 0.7 \qquad (2)$$

and a third retardation value (R3) according to equation (3) when a black voltage for a black image is applied, $$0.1 < R3/\lambda < 0.15 \qquad (3).$$

In another aspect, a method of fabricating an optically compensated birefringence mode liquid crystal display device includes forming first and second substrates facing and spaced apart from each other, forming a liquid crystal material layer between the first and second substrates, the liquid crystal material layer having a splay state when a voltage is not applied and having a bend state when a transition voltage is applied, forming a first compensation film on an outer surface of the first substrate, forming a first polarizing plate on the first compensation film, forming a second compensation film on an outer surface of the second substrate, and forming a second polarizing plate on the second compensation film, wherein the liquid crystal material layer in the splay state has a first retardation value (R1) satisfying according to equation (1), $$1.35 < R1/\lambda < 1.75 \qquad (1)$$

the liquid crystal material layer in the bend state has a second retardation value (R2) according to equation (2) when a white voltage for a white image is applied, $$0.5 < R2/\lambda < 0.7 \qquad (2)$$

and a third retardation value (R3) according to equation (3) when a black voltage for a black image is applied, $$0.1 < R3/\lambda < 0.15 \qquad (3).$$

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Figure 1:
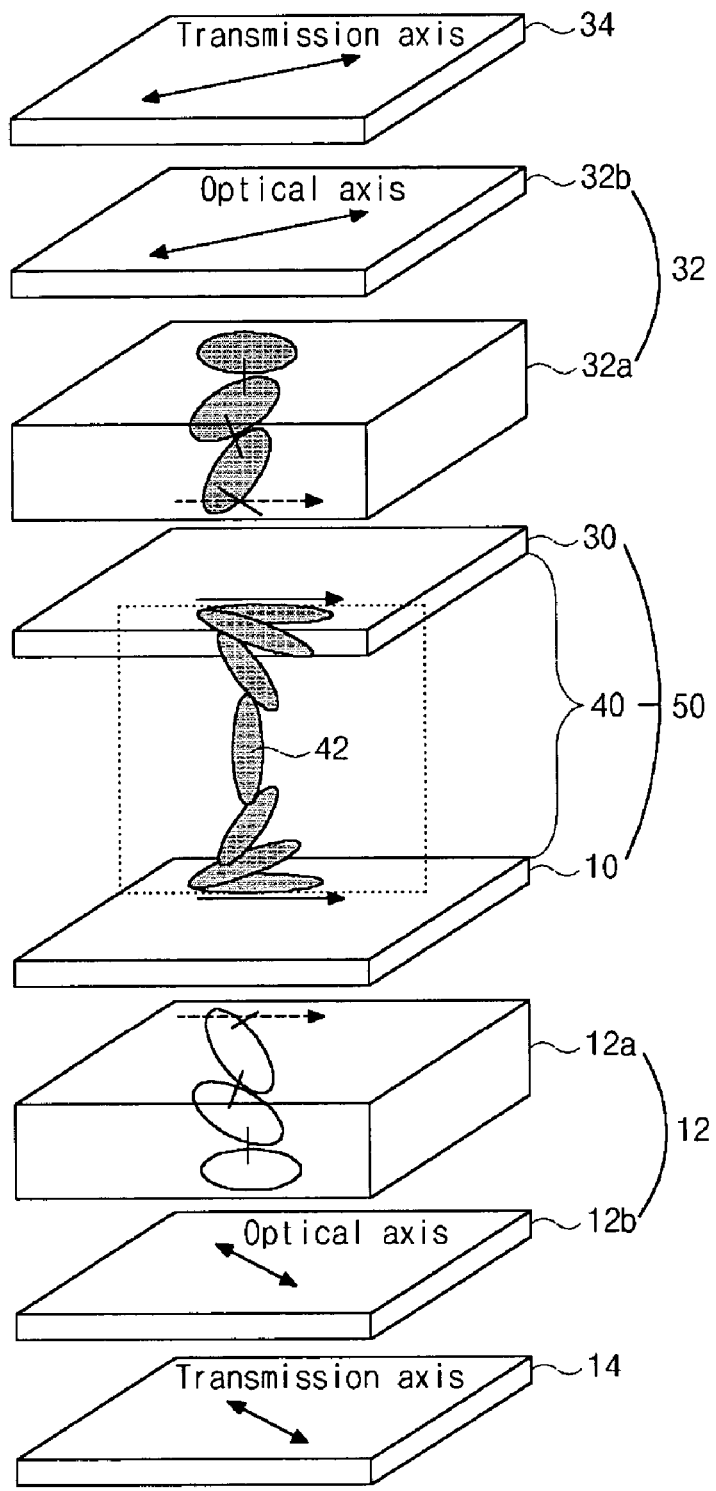
FIG. 1 is a schematic perspective view of an optically compensated birefringence mode liquid crystal display device including a compensation film according to the related art.
Figure 2A:
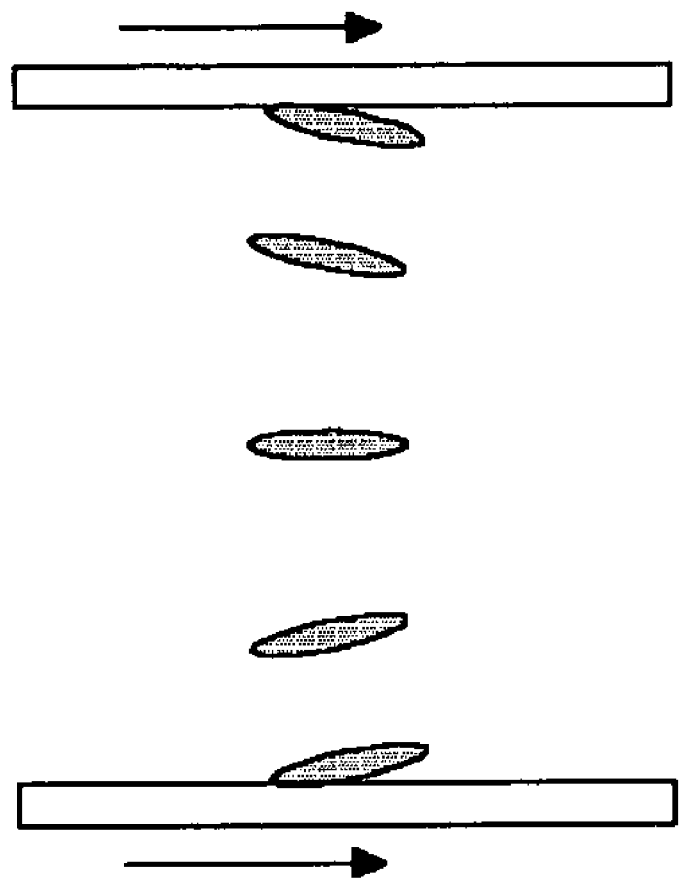
FIGS. 2A to 2C are schematic cross sectional views showing a driving principle of an optically compensated birefringence mode liquid crystal display device according to the related art.
Figure 2B:
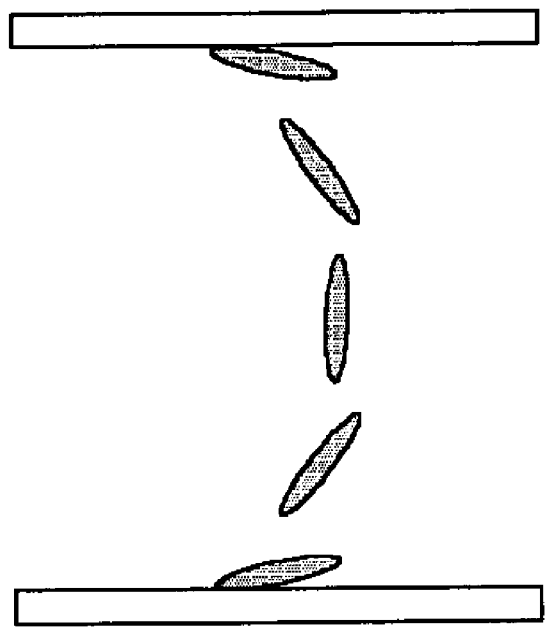
Figure 2C:
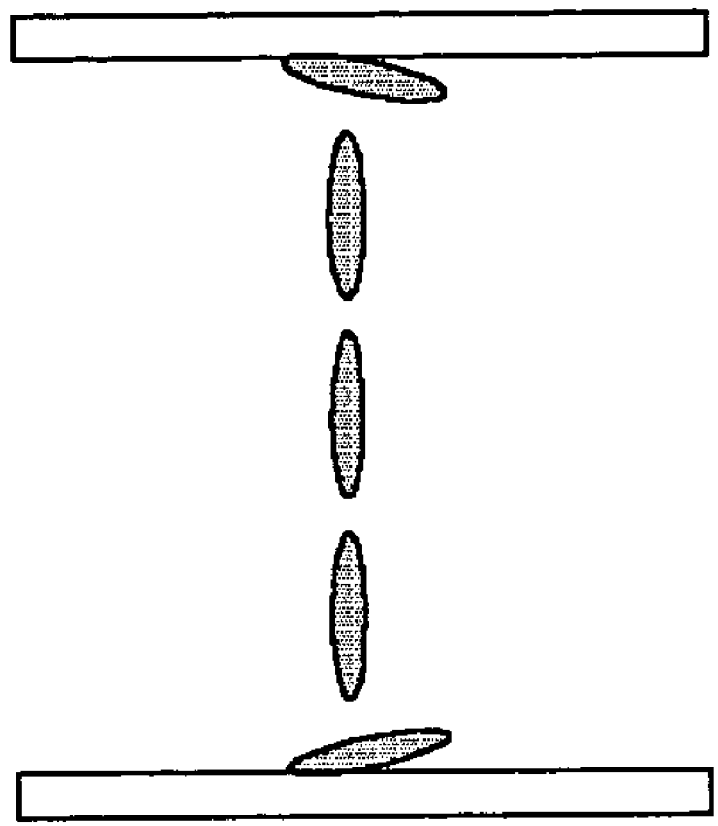

Reference will now be made in detail to the illustrated embodiments of the present invention, examples of which are illustrated in the accompanying drawings.

TABLE 1 shows a relation between a bend elastic modulus and a voltage for a black image of an OCB mode LCD device in a normally white mode according to the present invention. TABLE 2 shows a relation between a dielectric constant anisotropy and a voltage for a black image of an OCB mode LCD device in a normally white mode according to the present invention. A voltage for a black image of an OCB mode LCD device in a normally white mode will be referred to as a black voltage for purposes of discussion in this specification.

TABLE 1

| BEND ELASTIC MODULUS ($K_{33}$) | BLACK VOLTAGE |
| --- | --- |
| 9.0 | 5.6 V |
| 9.9 | 5.9 V |
| 10.8 | 6.1 V |

TABLE 2

| DIELECTRIC CONSTANT ANISOTROPY ($\Delta\epsilon$) | BLACK VOLTAGE |
| --- | --- |
| 11.9 | 5.3 V |
| 10.6 | 5.9 V |
| 8.6 | 6.8 V |

As shown in TABLEs 1 and 2, as the bend elastic modulus "$K_{33}$" decreases and the dielectric constant anisotropy "$\Delta\epsilon$" increases, an OCB mode LCD device may be driven by a lower driving voltage, wherein a bend structure may become more stable. For example, when the bend elastic modulus "$K_{33}$" and the dielectric constant anisotropy "$\Delta\epsilon$" satisfy equation (1), an OCB mode LCD device may be stably driven by a low voltage.

$$0.85 < K_{33}/\Delta\epsilon < 1.5 \qquad (1)$$

TABLE 3 shows a variation of refractive index anisotropy with respect to a temperature for several liquid crystal samples for a TN mode LCD device. TABLE 4 shows a variation of refractive index anisotropy with respect to a temperature for several liquid crystal samples for an OCB mode LCD device. To obtain an OCB mode LCD device that stably functions with regard to ambient heat of a backlight unit, a range of phase transition temperatures from nematic to isotropic phases of an OCB mode LCD device should be determined. For example, a temperature of the backlight unit may be about 40° C., and an ambient operating temperature of of the OCD mode LCD device may depend on a specific application condition and the time of year.

TABLE 3

NORMALIZED REFRACTIVE INDEX ANISOTROPY ($\Delta n(T)/\Delta n(20°\ C.)$)

| TEMPERATURE (T) | SAMPLE 1 ($T_{ni}$: 103° C.) | SAMPLE 2 ($T_{ni}$: 96° C.) | SAMPLE 3 ($T_{ni}$: 83° C.) | SAMPLE 4 ($T_{ni}$: 75° C.) |
|---|---|---|---|---|
| 0° C. | 1.0486 | 1.0546 | | |
| 20° C. | 1.0000 | 1.0000 | 1.0000 | 1.0000 |
| 40° C. | 0.9527 | 0.9516 | 0.9222 | 0.9027 |
| 60° C. | 0.8879 | 0.8722 | 0.7901 | 0.7668 |

TABLE 4

NORMALIZED REFRACTIVE INDEX ANISOTROPY ($\Delta n(T)/\Delta n(20°\ C.)$)

| TEMPERATURE (T) | SAMPLE 1 ($T_{ni}$: 117° C.) | SAMPLE 2 ($T_{ni}$: 87° C.) | SAMPLE 3 ($T_{ni}$: 82° C.) | SAMPLE 4 ($T_{ni}$: 81° C.) | SAMPLE 5 ($T_{ni}$: 79° C.) |
|---|---|---|---|---|---|
| 0° C. | 1.0510 | 1.0703 | 1.0736 | 1.0713 | 1.0700 |
| 20° C. | 1.0000 | 1.0000 | 1.0000 | 1.0000 | 1.0000 |
| 40° C. | 0.9414 | 0.9103 | 0.9085 | 0.9027 | 0.9101 |
| 60° C. | 0.8716 | 0.7951 | 0.7747 | 0.7648 | 0.7753 |

In TABLE 3, the TN mode liquid crystal samples have a refractive index anisotropy "$\Delta n(20°\ C.)$" of about 0.08 at a temperature of about 20° C., and the OCB mode liquid crystal samples of TABLE 4 have a refractive index anisotropy "$\Delta n(20°\ C.)$" of about 0.16 at a temperature of about 20° C. In TABLEs 3 and 4, a phase transition temperature from nematic to isotropic phases is represented as "$T_{ni}$." Moreover, a refractive index anisotropy of each sample is measured at various temperatures and normalized with respect to the refractive index anisotropy at a temperature of about 20° C.

In TABLEs 3 and 4, as the phase transition temperature "$T_{ni}$" increases, the temperature dependency of the refractive index anisotropy decreases. Accordingly, to obtain an OCB mode LCD device stable to ambient heat, the phase transition temperature "$T_{ni}$" of liquid crystal may satisfy equation (2).

$$90°\ C. < T_{ni} < 130°\ C. \tag{2}$$

Figure 3A:
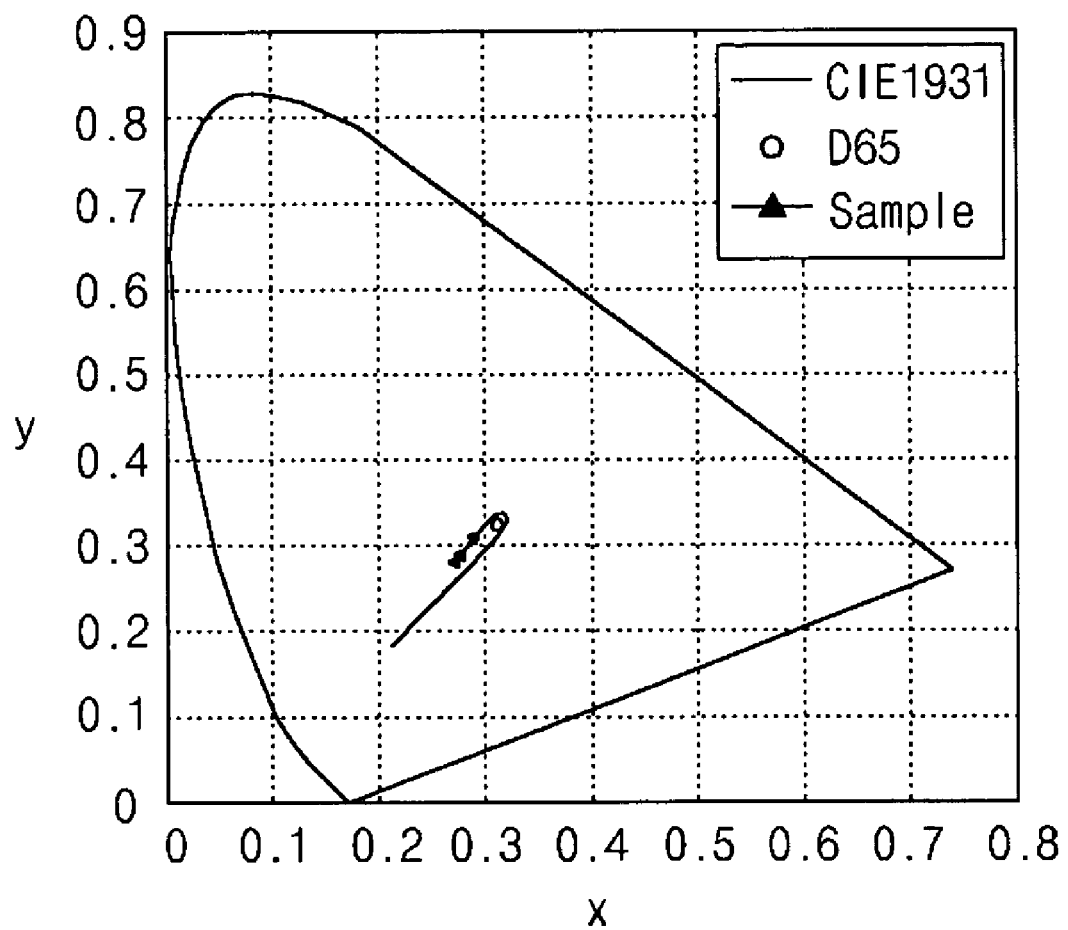
FIG. 3A is a graph showing a relationship between a first ratio of refractive index anisotropy values and a color coordinate property in a CIE 1931 chromaticity coordinate system of an exemplary OCB mode LCD device according to the present invention.
Figure 3B:
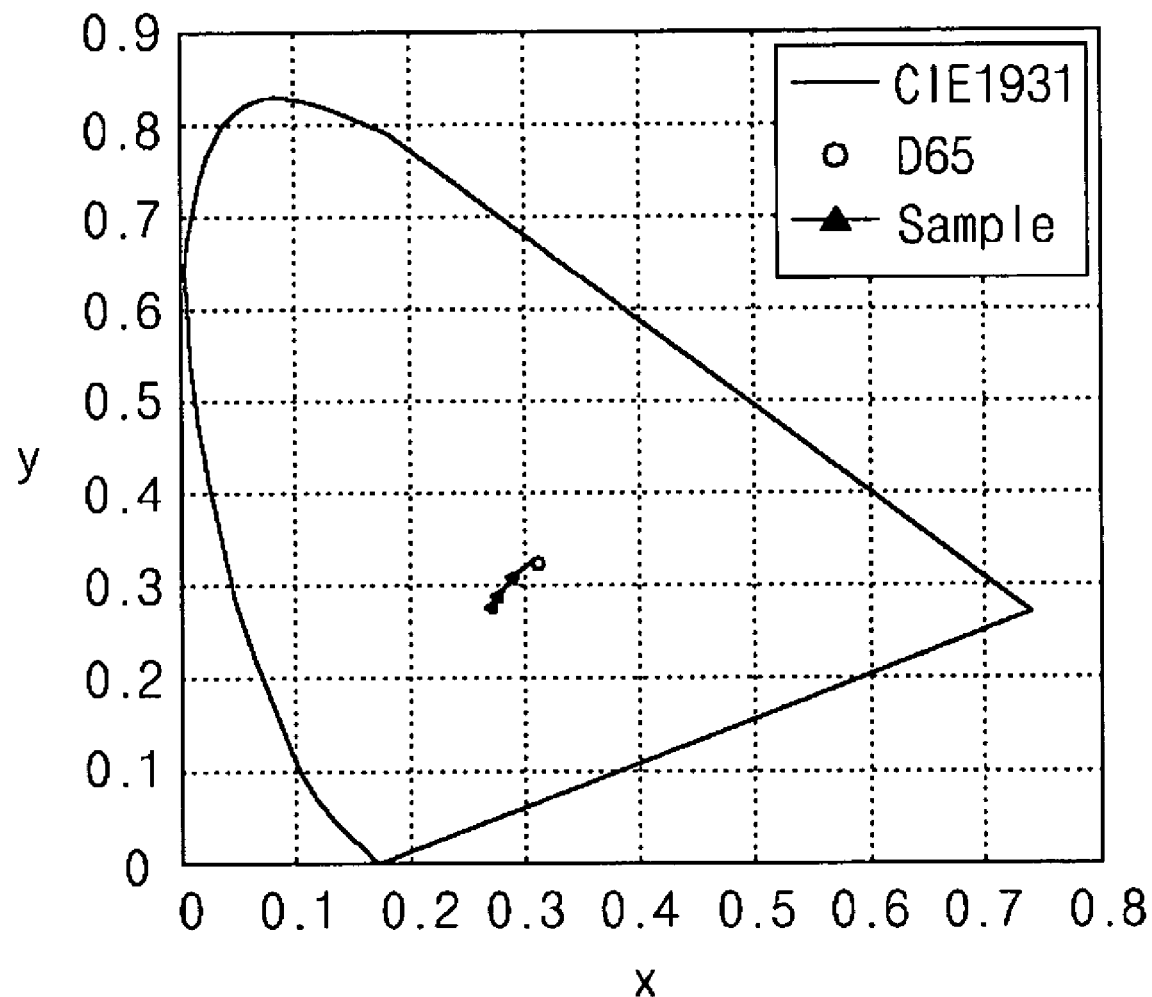
FIG. 3B is a graph showing another relationship between a second ratio of refractive index anisotropy values and a color coordinate property in a CIE 1931 chromaticity coordinate system of another exemplary OCB mode LCD device according to the present invention.

FIG. 3A is a graph showing a relationship between a first ratio of refractive index anisotropy values and a color coordinate property in a CIE 1931 chromaticity coordinate system of an exemplary OCB mode LCD device according to the present invention. FIG. 3B is a graph showing another relationship between a second ratio of refractive index anisotropy values and a color coordinate property in a CIE 1931 chromaticity coordinate system of another exemplary OCB mode LCD device according to the present invention. In FIGS. 3A and 3B, the first and second ratios "$\Delta n_{LC1}$(400 nm/550 nm)" and "$\Delta n_{LC2}$(400 nm/550 nm)" are about 1.551 and about 1.273, respectively.

In FIGS. 3A and 3B, a blue shift of the first ratio "$\Delta n_{LC1}$(400 nm/550 nm)" may be larger than a blue shift of the second ratio "$\Delta n_{LC2}$(400 nm/550 nm)." Accordingly, a ratio "$\Delta n_{LC}$(400 nm/550 nm)" of refractive index anisotropy values may be designed to satisfy equation (3) for reducing a blue color shift and improving a contrast ratio.

$$1.2 < \Delta n_{LC}(400\ nm/550\ nm) < 1.3 \tag{3}$$

Figure 4A:
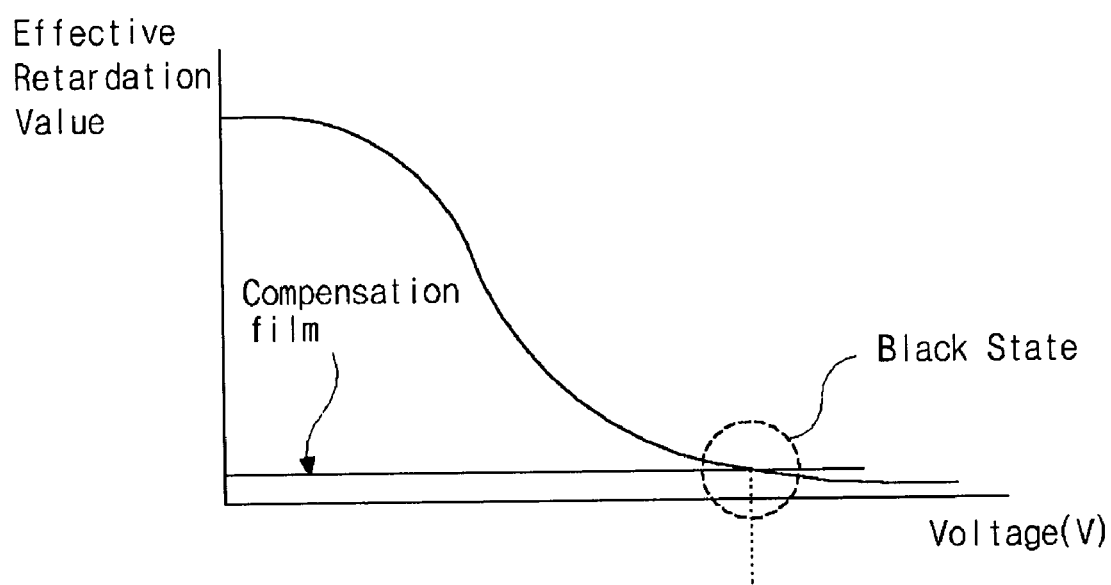
FIG. 4A is a graph showing exemplary effective retardation values of an OCB mode LCD device with respect to a voltage according to the present invention.
Figure 4B:
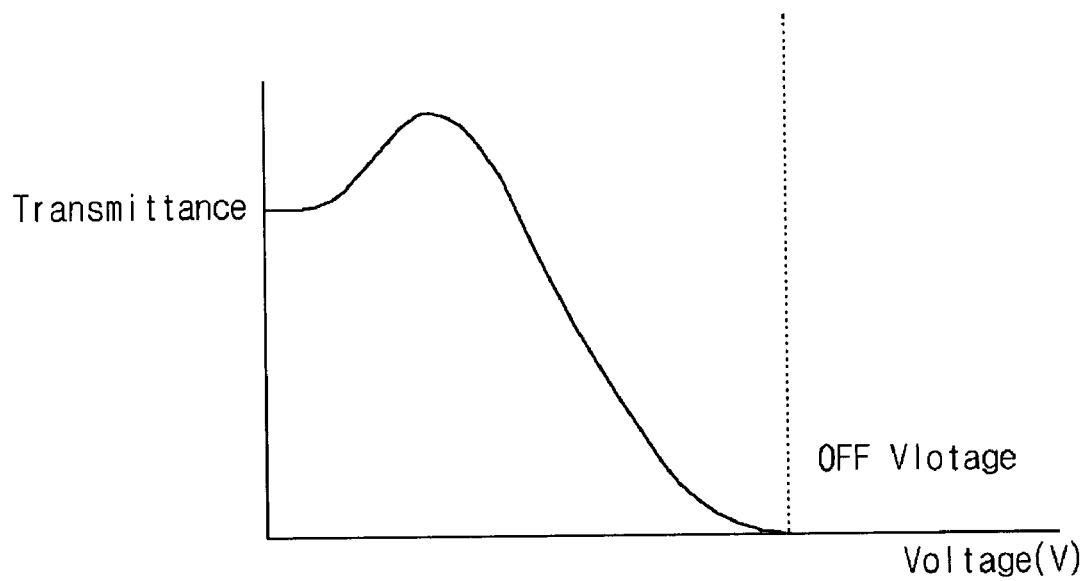
FIG. 4B is a graph showing exemplary transmittance variations of an OCB mode LCD device with respect to a voltage according to the present invention.

FIG. 4A is a graph showing exemplary effective retardation values of an OCB mode LCD device with respect to a voltage according to the present invention. FIG. 4B is a graph showing exemplary transmittance variations of an OCB mode LCD device with respect to a voltage according to the present invention. An OCB mode LCD device in a normally white mode is used in FIGS. 4A and 4B.

In FIGS. 4A and 4B, if a compensation film is not used for an OCB mode LCD device, a complete black state may not be obtained in an available voltage region. For example, a black state may be obtained when a retardation value of a liquid crystal material coincides with a retardation value of a compensation film throughout an entire wavelength range. When a retardation value of a liquid crystal material does not coincide with a retardation value of a compensation film, contrast ratio is reduced and color shift occurs. Accordingly, a retardation value may be designed to satisfy equation (4) for a splay state, and equations (5-1) and (5-2) for a bend state.

Splay State $$1.35 < R(V=0)/\lambda < 1.75 \tag{4}$$

wherein $R(V=0)$ is a retardation value when a voltage of 0 is applied.

Bend State $$0.5 < R(V=V_{white})/\lambda < 0.7 \tag{5-1}$$

wherein $R(V=V_{white})$ is a retardation value when a voltage for a white image is applied.

$$0.1 < R(V=V_{black})/\lambda < 0.15 \tag{5-2}$$

wherein $R(V=V_{black})$ is a retardation value when a voltage for a black image is applied.

Figure 5:
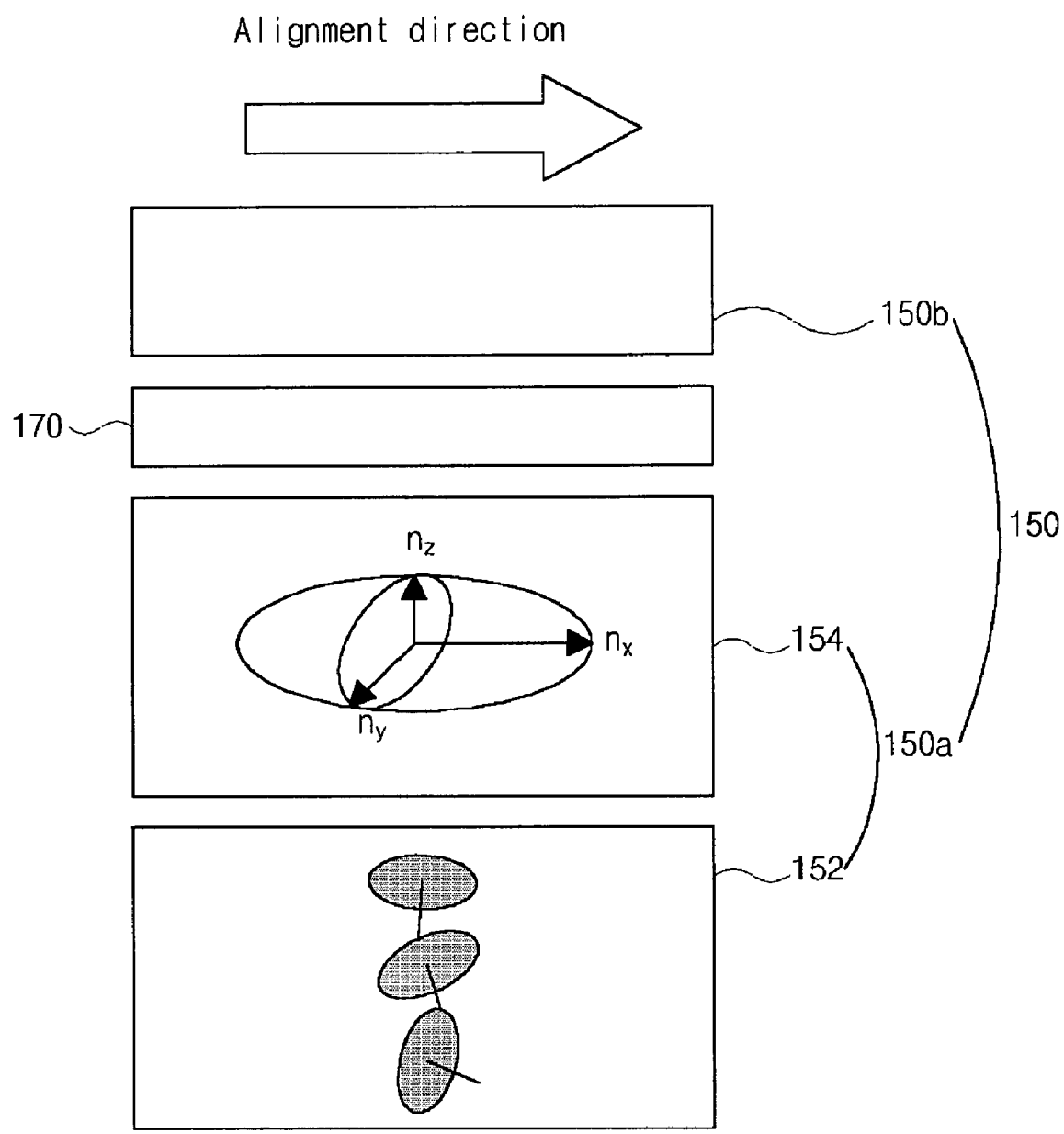
FIG. 5 is a schematic diagram showing an exemplary compensation film for an OCB mode LCD device according to the present invention.

FIG. 5 is a schematic diagram showing an exemplary compensation film for an OCB mode LCD device according to the present invention. In FIG. 5, a compensation film 150 may include a wide view (WV) film 150a and a tri acetate cellulose (TAC) film 150b, wherein a polarizing plate 170 may be interposed between the WV film 150a and the TAC film 150b. The WV film 150a may include a discotic liquid crystal film 152 and a biaxial film 154, wherein the TAC 150b may be considered a type of biaxial film. The discotic liquid crystal film 152 and the TAC film 150b, including the biaxial film 154, may be designed such that ratios of retardation values satisfy equations (6) and (7), respectively.

Discotic Liquid Crystal Film $$2.8 \leq R_{th}/R_e \leq 3.2 \tag{6}$$

wherein $R_{th}$ is a retardation value defined by $(n_z-(n_x+n_y)/2)d$, $R_e$ is a retardation value defined by $(n_x-n_y)d$.

TAC (Biaxial Film)

$$4.8 \leq R_{th}/R_e \leq 5.2 \tag{7}$$

wherein $R_{th}$ is a retardation value defined by $(n_z-(n_x+n_y)/2)d$, $R_e$ is a retardation value defined by $(n_x-n_y)d$.

Moreover, to improve a compensation effect, a discotic liquid crystal material film may be designed to have a wavelength dispersion similar to a wavelength disperson of the liquid crystal material layer. Accordingly, a ratio of refractive index anisotropy values of the discotic liquid crystal film may satisfy equation (8).

$$1.2 < \Delta n_{discotic}(400 \text{ nm}/550 \text{ nm}) < 1.3 \tag{8}$$

Accordingly, an OCB mode LCD device having a fast response, wide viewing angle, high brightness, and low driving voltage may be obtained by applying the design parameters and rules for a bend cell and a compensation film to the fabrication process.

It will be apparent to those skilled in the art that various modifications and variations can be made in the OCB mode LCD device and method of fabricating an OCB mode LCD device of the present invention without departing from the spirit or scope of the inventions. Thus, it is intended that the present invention covers the modifications and variations of this invention provided they come within the scope of the appended claims and their equivalents.

What is claimed is:

1. An optically compensated birefringence mode liquid crystal display device, comprising:
    first and second substrates facing and spaced apart from each other;
    a liquid crystal material layer between the first and second substrates, the liquid crystal material layer having a splay state when a voltage is not applied and having a bend state when a transition voltage is applied;
    a first compensation film on an outer surface of the first substrate;
    a first polarizing plate on the first compensation film;
    a second compensation film on an outer surface of the second substrate; and
    a second polarizing plate on the second compensation film,
    wherein the liquid crystal material layer in the splay state has a first retardation value (R1) according to:

$$1.35 < R1/\lambda < 1.75$$

the liquid crystal material layer in the bend state has a second retardation value (R2) according to:

$$0.5 < R2/\lambda < 0.7$$

when a white voltage for a white image is applied, and a third retardation value (R3) according to:

$$0.1 < R3/\lambda < 0.15$$

when a black voltage for a black image is applied.

2. The device according to claim 1, further comprising:
    a first orientation film between the first substrate and the liquid crystal material layer; and
    a second orientation film between the second substrate and the liquid crystal material layer,
    wherein the first orientation film has the same alignment direction as the second orientation film.

3. The device according to claim 2, wherein the liquid crystal material layer in the bend state has a bend elastic modulus ($K_{33}$) and a dielectric constant anisotropy ($\Delta\epsilon$) according to:

$$0.85 < K_{33}/\Delta\epsilon < 1.5.$$

4. The device according to claim 2, wherein the liquid crystal material layer has a phase transition temperature ($T_{ni}$) from a nematic phase to an isotropic phase according to:

$$90° \text{ C.} < T_{ni} < 130° \text{ C.}$$

5. The device according to claim 2, wherein the liquid crystal material layer has a ratio ($\Delta n_{LC}(400 \text{ nm}/550 \text{ nm})$) of refractive index anisotropy values for wavelengths of 400 nm and 550 nm according to:

$$1.2 < \Delta n_{LC}(400 \text{ nm}/550 \text{ nm}) < 1.3.$$

6. The device according to claim 2, wherein the first compensation film includes a first discotic liquid crystal film on the outer surface of the first substrate and a first biaxial film on the first discotic liquid crystal film, wherein the second compensation film includes a second discotic liquid crystal film on the outer surface of the second substrate and a second biaxial film on the second discotic liquid crystal film.

7. The device according to claim 6, wherein each of the first and second discotic films have a ratio ($\Delta n_{discotic}(400 \text{ nm}/550 \text{ nm})$) of refractive index anisotropy values for wavelengths of 400 nm and 550 nm according to:

$$1.2 < \Delta n_{discotic}(400 \text{ nm}/550 \text{ nm}) < 1.3.$$

8. The device according to claim 7, wherein each of the first and second discotic liquid crystal films have a ratio ($R_{th}/R_e$) of retardation values $R_{th}$ and $R_e$ defined by $R_{th}=\{n_z-(n_x+n_y)/2\}d$ and $R_e=(n_x-n_y)d$ according to:

$$2.8 \leq R_{th}/R_e \leq 3.2.$$

9. The device according to claim 8, further comprising a first TAC film on the first polarizing plate and a second TAC film on the second polarizing plate.

10. The device according to claim 9, wherein each of the first and second biaxial films and the first and second TAC films have a ratio ($R_{th}/R_e$) of retardation values $R_{th}$ and $R_e$ defined by $R_{th}=\{n_z-(n_x+n_y)/2\}d$ and $R_e=(n_x-n_y)d$ according to:

$$4.8 \leq R_{th}/R_e \leq 5.2.$$

11. A method of fabricating an optically compensated birefringence mode liquid crystal display device, comprising:
    forming first and second substrates facing and spaced apart from each other;
    forming a liquid crystal material layer between the first and second substrates, the liquid crystal material layer having a splay state when a voltage is not applied and having a bend state when a transition voltage is applied;
    forming a first compensation film on an outer surface of the first substrate;
    forming a first polarizing plate on the first compensation film;
    forming a second compensation film on an outer surface of the second substrate; and
    forming a second polarizing plate on the second compensation film, wherein the liquid crystal material layer in the splay state has a first retardation value (R1) satisfying according to:

$$1.35 < R1/\lambda < 1.75$$

the liquid crystal material layer in the bend state has a second retardation value (R2) according to:

$$0.5 < R2/\lambda < 0.7$$

when a white voltage for a white image is applied, and a third retardation value (R3) according to:

$$0.1 < R3/\lambda < 0.15$$

when a black voltage for a black image is applied.

12. The method according to claim 11, further comprising:
forming a first orientation film between the first substrate and the liquid crystal material layer; and
forming a second orientation film between the second substrate and the liquid crystal material layer,
wherein the first orientation film has the same alignment direction as the second orientation film.

13. The method according to claim 12, wherein the liquid crystal material layer in the bend state has a bend elastic modulus ($K_{33}$) and a dielectric constant anisotropy ($\Delta\epsilon$) according to:

$$0.85 < K_{33}/\Delta\epsilon < 1.5.$$

14. The method according to claim 12, wherein the liquid crystal material layer has a phase transition temperature ($T_{ni}$) from a nematic phase to an isotropic phase according to:

$$90° C. < T_{ni} < 130° C.$$

15. The method according to claim 12, wherein the liquid crystal material layer has a ratio ($\Delta n_{LC}$(400 nm/550 nm)) of refractive index anisotropy values for wavelengths of 400 nm and 550 nm according to:

$$1.2 < \Delta n_{LC}(400\ nm/550\ nm) < 1.3.$$

16. The method according to claim 12, wherein the first compensation film includes a first discotic liquid crystal film on the outer surface of the first substrate and a first biaxial film on the first discotic liquid crystal film, wherein the second compensation film includes a second discotic liquid crystal film on the outer surface of the second substrate and a second biaxial film on the second discotic liquid crystal film.

17. The method according to claim 16, wherein each of the first and second discotic films have a ratio ($\Delta n_{discotic}$(400 nm/550 nm)) of refractive index anisotropy values for wavelengths of 400 nm and 550 nm according to:

$$1.2 < \Delta n_{discotic}(400\ nm/550\ nm) < 1.3.$$

18. The method according to claim 17, wherein each of the first and second discotic liquid crystal films have a ratio ($R_{th}/R_e$) of retardation values $R_{th}$ and $R_e$ defined by $R_{th} = \{n_z - (n_x+n_y)/2\}d$ and $R_e = (n_x-n_y)d$ according to:

$$2.8 \leq R_{th}/R_e \leq 3.2.$$

19. The method according to claim 18, further comprising forming a first TAC film on the first polarizing plate and forming a second TAC film on the second polarizing plate.

20. The method according to claim 19, wherein each of the first and second biaxial films and the first and second TAC films have a ratio ($R_{th}/R_e$) of retardation values $R_{th}$ and $R_e$ defined by $R_{th} = \{n_z-(n_x+n_y)/2\}d$ and $R_e=(n_x-n_y)d$ according to:

$$4.8 \leq R_{th}/R_e \leq 5.2.$$

* * * * *